Dec. 2, 1969 W. E. HARRISON ET AL 3,482,254
APPARATUS FOR RECORDING THE TIME-VARIATION OF AN
ELECTRICAL SIGNAL UTILIZING A PULSED LASER
Filed Dec. 6, 1967

INVENTORS.
WAYNE E. HARRISON
STEPHEN J. JATRAS

BY  *Head & Johnson*

ATTORNEYS

United States Patent Office 3,482,254
Patented Dec. 2, 1969

3,482,254
APPARATUS FOR RECORDING THE TIME-VARIATION OF AN ELECTRICAL SIGNAL UTILIZING A PULSED LASER
Wayne E. Harrison and Stephen J. Jatras, Tulsa, Okla., assignors to Midwestern Instruments, Inc., a division of Telex Inc., Tulsa, Okla., a corporation of Delaware
Filed Dec. 6, 1967, Ser. No. 688,452
Int. Cl. G01d 15/10
U.S. Cl. 346—76      3 Claims

ABSTRACT OF THE DISCLOSURE

This invention relates to an apparatus for recording the time-variation of an electrical signal. More particularly, the invention relates to an apparatus for recording the time-variation of an electrical signal including a recording medium, means for moving the recording medium at preselected rates for the continuous recording of the time-varying electrical signal thereon, means of deflecting an electromagnetic beam onto said recording medium in response to the time-varying electrical signal, a laser medium, means for sequentially pumping the laser medium so that a population inversion is produced therein between an upper and lower energy level, the laser medium responding thereto to produce sequential bursts of electromagnetic energy onto said beam deflecting means, and means of varying the rate of pumping said laser medium.

SUMMARY

Figure 1:
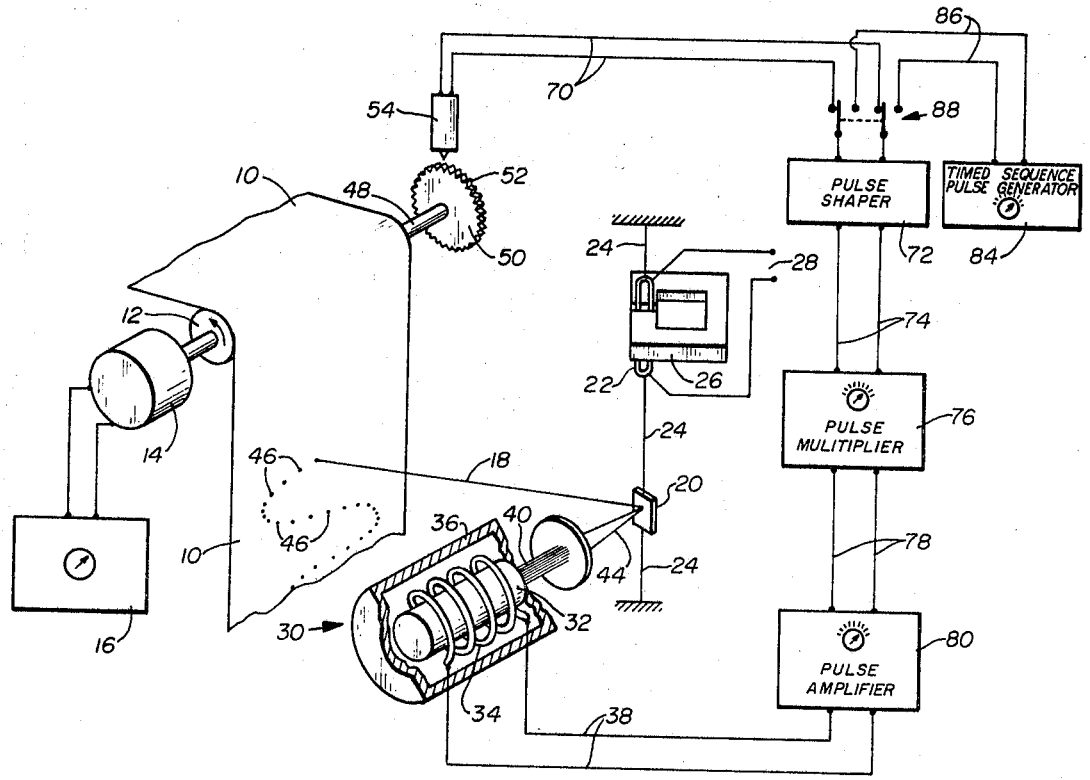

Oscillographs, which are common recording devices in widespread use, typically employ a deflecting mirror to trace electrical time-varying signals on a recording medium. The mirror is deflected by the effect of an electric current flowing through a coil suspended in a magnetic field, the deflection of the coil being transferred to the mirror. In the usual arrangement high intensity light, either in the visible or invisible spectrum, is directed continuously on the mirror with the light beam being reflected onto a moving record. The moving record customarily used is a treated paper sensitized to respond to the light beam impinging upon it. The recording paper requires subsequent development to visually reveal the trace thereon. Development may be by chemical treatment to make visible the path of the light beam directed thereon, other types of record mediums which are also chemically treated, are characterized by the appearance of the trace of the light beam by a process of light exposure and heat, either independently or concurrently, a process which is generally termed latensification. Chemically treated papers are required to be relatively sensitive since light beam from readily available light sources is relatively low in energy content. Stated in another way, light sources available to the present time of a size and current consuming requirement adaptable for use in oscillographs have required relatively sensitive recording mediums. The recent advent of the laser has made available a light source means having intensities heretofore unobtainable in apparatus having sizes usable in oscillographs.

The use of a laser as a light source in oscillography has been contemplated. One problem, however, exists with the application of lasers to oscillographs. Lasers are capable of discharging high intensities of magnetic energy, however, lasers are inefficient in overall light production relative to the quantity of energy which must be used for energization. This means that for any given amount of light or electromagnetic energy out of a laser, a substantial amount of energy is lost, primarily as heat. Thus, lasers are typically capable of producing a high intensity electromagnetic output for only a relatively short time, and this is especially true of lasers having geometrical configurations adaptable for use in oscillographs.

This invention provides a means of utilizing a laser in an oscillograph wherein the laser is energized so that high intensity short time duration electromagnetic pulses are caused to imprint a trace of a time-varying electrical signal on a recording medium. By utilizing a pulsed laser, electromagnetic intensities are available which are many times as great as the electromagnetic intensities available from presently known continuous light sources. Thus, by the advantages of the invention herein, means are provided to take advantage of the higher electromagnetic intensities available from laser sources. This means that the sensitivity of the recording medium can be much less without reducing the degree of a visual display of the time-varying electrical signal compared to the present oscillograph arrangement utilizing continuous electromagnetic energy sources. In addition, the invention provides means of utilizing an untreated record medium in an arrangement wherein the intensity of the sequential bursts of electromagnetic energy received from the laser are sufficient to thermally decompose or alter the record medium to the extent necessary to provide clearly visible traces of the time-varying electrical signal.

In addition, an advantage of the invention, which accrues whether a treated or untreated record medium is utilized, is that pulses of electromagnetic energy producing sequential spots tracing a time-varying signal on a record medium, the spots being equally timed spaced. Thus the distance between the spots, or points of impingement of the electromagnetic beam on the record medium, is a ready visual indication of the first differential of the time varying electrical signal. More commonly stated, the distance between the spots formed on the record which trace the time-varying signal indicates at each point on the trace the rate of change on the signal, which rate of change is readily compared without resort to further mathematical calculation.

In addition, this invention provides means in an oscillograph for automatically adjusting the pulsing rate of a laser as the speed of movement of the record is changed. Further, the invention provides means of adjusting the pulsing rate of the laser proportional to the speed of the moving record in an arrangement wherein the proportionality is automatically maintained as the speed of the moving record is varied. In another embodiment means is provided for regulating the time sequence of a pulsed laser for recording a trace of a time-varying electrical signal on a moving record medium independent of the speed of movement of the record medium.

DESCRIPTION OF THE VIEWS

FIGURE 1 is an exploded perspective view of an oscillograph recording system utilizing the principles of this invention showing means whereby the energy from a pulse laser is directed onto a moving record medium to trace a time-varying electrical signal.

Figure 2:
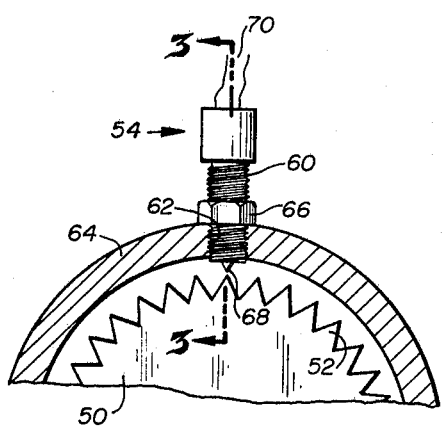

FIGURE 2 uses an enlarged view of the pulse generating wheel showing an arrangement wherein a varying voltage pulse is produced in proportion to the rate of movement of the record medium.

Figure 3:
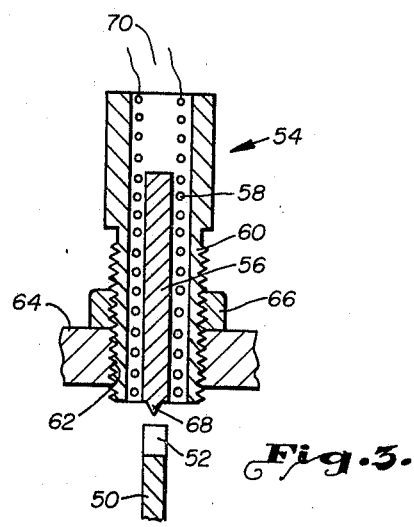

FIGURE 3 is an enlarged cross-sectional view of a magnetic pickup element utilized to produce a voltage variation in proportion to the rate of movement of the record medium.

DETAILED DESCRIPTION

Referring now to the drawings and first to FIGURE 1, a perspective view of an oscillograph arrangement including the basic elements forming the subject of this invention is shown. A record medium 10 provides the material upon which a time-varying electrical signal is visually traced. Typically the record medium 10 is an elongated strip of paper and may either be treated or untreated. In prior known oscillograph technology wherein continuous light generating means are utilized the record medium 10 is, of necessity, treated with light sensitive materials. In the presently used arrangement the trace provided on the record 10 is made visible by one of two basic arrangements, that is, first by treating the record subsequent to exposure to chemical treatment, or second, by latensification of the trace by subjecting the sensitized record to light and/or heat. This invention provides a new arrangement for producing a visual record of a time-varying electrical signal on the record medium 10.

The record medium 10 is moved by means of rotation of a paper cylinder 12, rotated by a motor 14. In the preferred arrangement of the invention motor 14 is a variable speed motor so that varying speeds of movement of the record medium 10 may be obtained. The output speed of motor 14 is varied by means of a speed control device 16, the exact arrangement of which is not a part of this invention, however, for a detailed description of one arrangement wherein means to achieve accurate variable speed control of the movement of record 10 is disclosed, reference may be had to pending United States application No. 653,477 filed July 14, 1967.

A trace of the time-varying electrical signal is formed on record 10 by means of an electromagnetic beam 18 reflected from a mirror 20, the mirror being part of a galvanometer which includes a coil 22 and suspension wires 24. Coil 22 is placed in a gap in a magnetic structure 26. The time-varying electrical signal is fed to input points 28 and across the coil 22. Current flow in the coil 22 establishes a magnetic field which reacts with the magnetic field of structure 26 causing the coil 22 to be deflected, which deflections are mechanically transferred to mirror 20. Thus the light beam 18 traces the time-variation on record 10 of the electrical signal applied across input points 28.

The structure described to this point is that of the typically available oscillograph which normally utilizes a continuous light source providing light directed onto mirror 22 and reflected as beam 18.

In this invention, light, or electromagnetic energy, is directed onto mirror 20 from a laser generally indicated by the numeral 30. While laser 30 may be of many varying configurations and arrangements, the illustrated arrangement, for the purposes of exemplification, includes a laser medium 32, such as a ruby rod, a pumping means 34, such as a flash tube coiled around the laser medium 32, and an optically resonant cavity 36 surrounding the laser medium and pumping means. Cavity 36 has an opening through which the beam of electromagnetic energy emanating from one end of the laser medium may pass. In the illustrated arrangement wherein the laser medium is a ruby rod the end opposite that from which the electromagnetic energy passes is reflective.

The laser 30 generates a burst of electromagnetic energy in response to electrical pulses applied across conductors 38 which flash the pumping means 34 to produce a population inversion of the later medium 32 between an upper and lower energy level. On each pulse of electrical energy across conductors 38, the laser emanates a high intensity short duration beam of electromagnetic energy 40 which is concentrated by lens system 42 into a high intensity small diameter beam 44 directed onto mirror 20.

Beam 44 is reflected from mirror 22 as beam 18 which impinges upon the record medium 10. On each pumping of the laser 30, that is, upon each pulse of electrical energy supplied by conductor 38, a high energy point of light impinges upon the record 10 and produces a record spot 46. The spot 46 may be produced upon record 10 either as a result of the action of the electromagnetic beam upon the chemicals of the treated record medium, or if the record medium is untreated, the spot 46 is made visible by thermal effect of the beam.

One of the primary novelties of this invention is the provision of means of pulsing laser 30 in response to the speed of movement of the record 10 to provide a sequence of spots 46 on the record which reveals the time-variation of the electrical signal applied at the input points 28.

Affixed to record cylinder 12 by means of shaft 48 extending therefrom is a pulse generating wheel 50. The wheel 50 has a periphery defined by continuous, evenly and closely spaced substantially V-shaped teeth 52. (See FIGURE 2.) Wheel 50, or at least teeth 52, are of paramagnetic material. Adjacent the periphery made up of spaced teeth 52 is a magnetic pickup 54 which, as shown best in FIGURE 3, includes a magnetized core element 56 surrounded by a coil 58. The magnetic pickup 54 further includes, by way of exemplification, a cylindrical externally threaded housing 60 which is received in internally threaded opening 62 formed in a gear housing 64. The gear housing is not shown in FIGURE 1. A nut 66 on the externally threaded body 60 holds the housing in proper threaded relationship relative to the gear housing 64. By loosening nut 66 the pickup housing 60 may be threadably advanced toward or away from the teeth 52 for proper positioning of the inner end 68 of core element 56 relative to teeth 52.

As gear 50 rotates teeth 52 sequentially passes adjacent the inner tip 68 of the magnetized core element 56 and due to the variation in the magnetic fields around the core element by the proximity of paramagnetic teeth 52 a varying voltage is induced into the coil 58. The voltage pattern across coil 58 is directly related to the passage of each tooth 52 past the inner tip 68 of the core element. Thus, a varying voltage signal is provided on conductors 70. This voltage is fed to a pulse shaper network 72. (See FIGURE 1.)

The output of pulse shaper 72, across conductor 74, is a sequence of votlage pulses, each voltage pulse representing the passage of a tooth 52 past magnetic pickup 54. The voltage pulses on conductor 74 are fed to the input of a pulse multiplier circuit 76. The output of pulse multiplier 76 across conductor 78 is a sequence of voltage pulses which are a multiple of pulses received from magnetic pickup 54. That is, pulse multiplier 76 provides means of selectably impressing across conductor 78 voltage pulses which are timed sequenced as multiples of the voltage output from the magnetic pickup 54. Thus, if the pulse multiplier is set for one to one pulse output, a voltage pulse will appear on conductor 78 each time a tooth 42 passes magnetic pickup 54. If the pulse multiplier is set at one for two, then a pulse will appear across conductor 78 for each second tooth 52 which passes the magnetic pickup 54. In like manner, voltage pulses have one for three, one for four, and so forth, may be selected. In a similar arrangement, involving slightly more complicated circuitry, multiples of the voltage pulses from magnetic pickup 54 may be provided across conductor 78, that is, two equal time spaced pulses for each tooth 52 which passes the magnetic pickup 54 or any other similar multiple relationship.

It can be seen that the provision of the pulse multiplier circuit 76 is not indispensable and that the simplest embodiment of the invention includes the direct application across conductor 78 of the output of pulse shaper 72.

The pulses across conductor 78 are fed into the input of a pulse amplifier 80. The output of pulse amplifier 80 is taken across conductors 38, the output being utilized to pulse the pumping means 34 of laser 30. The pulse amplifier 80 preferably includes means of selectably varying the pulse intensity applied across conductor 38.

An alternate arrangement of the invention includes a timed sequence pulse generator 84 which produces a selectable time varying voltage signal wherein the time variations are independent of the rate of movement of the recording medium. The output from the timed sequence pulse generator appears across conductors 86.

Switch 88 permits the input to the pulse shaper 72 to be selected from either the magnetic pickup 54 or the timed sequence pulse generator 84.

OPERATION

The user of the oscillograph of this invention selects a rate of movement of record medium 10 by means of speed control device 16. As an example, if a great amount of general information is required to be recorded on the record medium then a slow record speed may be selected. On the other hand, if detailed information of a highly varying electrical signal is required under circumstances in which the quantity of record 10 utilized is of no consequence then a higher record speed will be selected.

It can be seen that regardless of the rate of movement of record 16 a voltage pulse is produced across conductors 70 as each tooth 52 passes the magnetic pickup 54. This voltage pulse is fed through pulse shaper 72 and to pulse multiplier 76. By adjustment of the pulse multiplier 76 the voltage pulse which is fed to the laser 30 can be selected to be a multiple of the voltage pulses from magnetic pickup 54. Pulse amplifier 80 provides voltage energy in pulse form to energize pumping means 34. As the pumping means is energized, the population inversion in the laser medium is raised to a high energy level resulting when the energy falls to the lower level, in a short duration high intensity beam of electromagnetic energy 40. This beam is directed onto mirror 20 and is reflected thereby onto record 10. The point of impingement on record 10 depends upon the alignment of mirror 20 which in turn is responsive to the electrical signal applied to input points 28. Thus, as shown on FIGURE 1, a sequence of spots or points of impingement of the pulsed energy beam is imparted to record 10. If a sensitized record medium is utilized then the sequence of spots 46 will appear following subsequent development. Because of the increased intensity of the energy of beam 18 striking the record medium the trace formed by the sequence of spots can be made available quicker than is normally available with a lower energy continuous beam. Corollarially, a record medium having a lower degree of sensitivity (and thereby greater economy) can be used to produce a visible record in the same time presently required for more sensitive (and expensive) record mediums using a continuous light source. In one embodiment contemplated by this invention, record medium 10 may be untreated paper wherein the spots 46 are produced by the thermal energy of the electromagnetic beam 18 without other chemical action.

The trace formed on the record medium 10 is a trace of sequential spots representing the time-variation of the electrical signal applied across input points 28. The operator may, at any time, change the speed of the record by adjustment of the speed control device 16. When this occurs, the pulsing of the laser 30 is automatically adjusted so that the same space relationship between the spots 46 on the record are maintained. It can be seen that a certain minimum spacial relationship between spots 46 is required in order to completely trace the time varying electrical signal. By the arrangement of this invention this relationship is maintained regardless of the change in speed of the record medium.

In an alternate arrangement of the invention a timed sequence pulse generator 84 produces sequential voltage pulses across conductors 86. By means of selector switch 88 these pulses may be fed to the pulse shaper 72 in place of voltage pulses from the magnetic pickup 54. The timed sequence pulse generator 84 provides voltage pulses of selectable time spacing which is independent at the rate of movement of record 10. By utilizing the pulse output from the timed sequence pulse generator 84 the spots formed on record medium 10 will be of equal timed spacing. This produces a trace on record medium 10 of a time-varying voltage signal appearing across input points 28 having advantages over presently known straight line tracing utilizing a continuous light source in that since the sequential spots 46 produced by the alternate arrangement of this invention are of equal time spacing, and therefore the physical spacing between the spots is a direct visual indication of the slope or first differential of the voltage curve at any given point.

By the sequential pulsing arrangement of this invention, whether by utilizing generating wheel 50 and magnetic pickup 54 to generate pulses responsive to the speed of movement of record 10, or time sequence pulses from generator 84, an arrangement is provided wherein a record is traced by a pulsed laser 30. In this way the output intensity of the electromagnetic beam 40 from the laser 30 may be exceedingly high without creating excessive heat in the laser.

It is understood that the arrangement of laser 30 is illustrated for purposes of exemplification only and the invention may be utilized with any type of laser device providing a high energy short duration output in response to pulsing.

While the invention has been described with a certain degree of particularity it is manifest that many changes may be made in the details of construction and the arrangement of components without departing from the spirit and scope of this disclosure.

What is claimed is:

1. An apparatus for recording the time-variation of an electrical signal comprising:
   a recording medium;
   means for moving the recording medium at preselected rates for recording the time-varying electrical signal thereon;
   means of deflecting an electromagnetic beam onto said recording medium in response to the time-varying electrical signal;
   a laser medium;
   means for sequentially pumping said laser medium so that a population inversion is produced therein between an upper and lower energy level, said laser medium responding thereto to produce sequential bursts of electromagnetic energy onto said beam deflecting means and from thence to impingement upon said record medium, each burst of electromagnetic energy from said laser medium producing a visible spot at the point of impingement on said record medium;
   first means for varying the rate of pumping said laser medium in response to selectable equal timed sequence pulses;
   second means for varying the rate of pumping said laser medium in proportion to the rate of movement of said record medium; and
   means for selectively connecting either said first or said second means for varying to said laser medium.

2. An apparatus for recording the time-variation of an electrical signal according to claim 1 in which the means for varying the rate of pumping said laser medium in proportion to the rate of movement of said record medium includes:
   a variable speed drive motor;
   means coupling the drive motor to move said recording medium;
   a pulse generating wheel having a periphery defined by continuous, evenly and closely spaced substantially V-shaped teeth, each tooth converging substantially to a point at the wheel periphery;
   a magnetic pickup supported adjacent the pulse generating wheel periphery and having a magnetized element and coil therein, said pickup providing a a voltage variation each time a said tooth on said wheel passes as said wheel is rotated; and
   pulse amplifier means having an input and output, the input being connected to receive the voltage variation from said pickup means, and the output being connected to said means for pumping said laser.

3. An apparatus for recording the time-variation of an electrical signal according to claim 2, including:

a pulse mutilple means having an input and an output, the input being connected to said magnetic pickup and the output to said pulse amplifier, the multiplier means providing pulses to said pulse amplifier at rates which are selectable multiples of said magnetic pickup voltage variations.

References Cited

UNITED STATES PATENTS

| | | | |
|---|---|---|---|
| 3,370,299 | 2/1968 | Wilson | 346—109 |
| 3,374,311 | 3/1968 | Hell | 178—6.6 |
| 3,245,083 | 4/1966 | Wilson et al. | 346—109 |
| 3,334,353 | 8/1967 | Everset | 346—76 |

JOSEPH W. HARTARY, Primary Examiner

U.S. Cl. X.R.

346—109; 331—94.5